L. A. & A. A. OWNBEY.
DIRECTION INDICATOR.
APPLICATION FILED JULY 16, 1917.
1,292,028.
Patented Jan. 21, 1919.
2 SHEETS—SHEET 2.
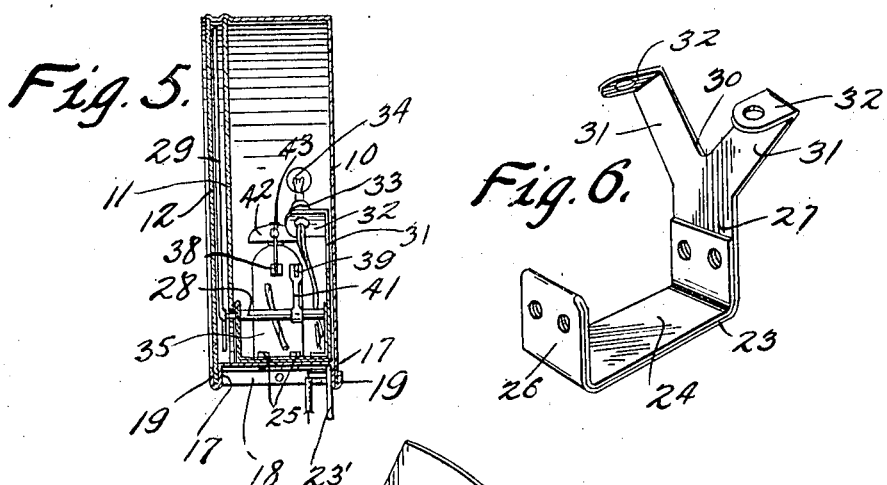
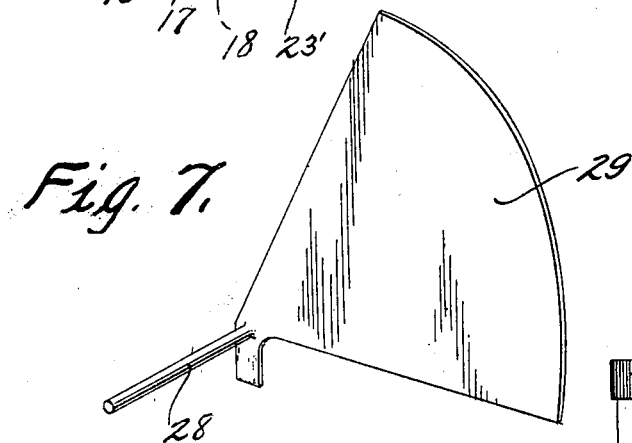
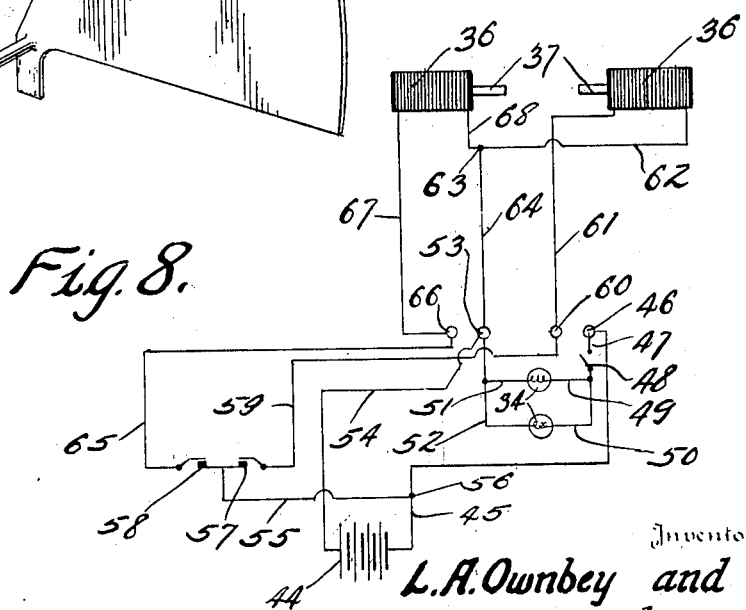
Inventor
L. A. Ownbey and
A. A. Ownbey.

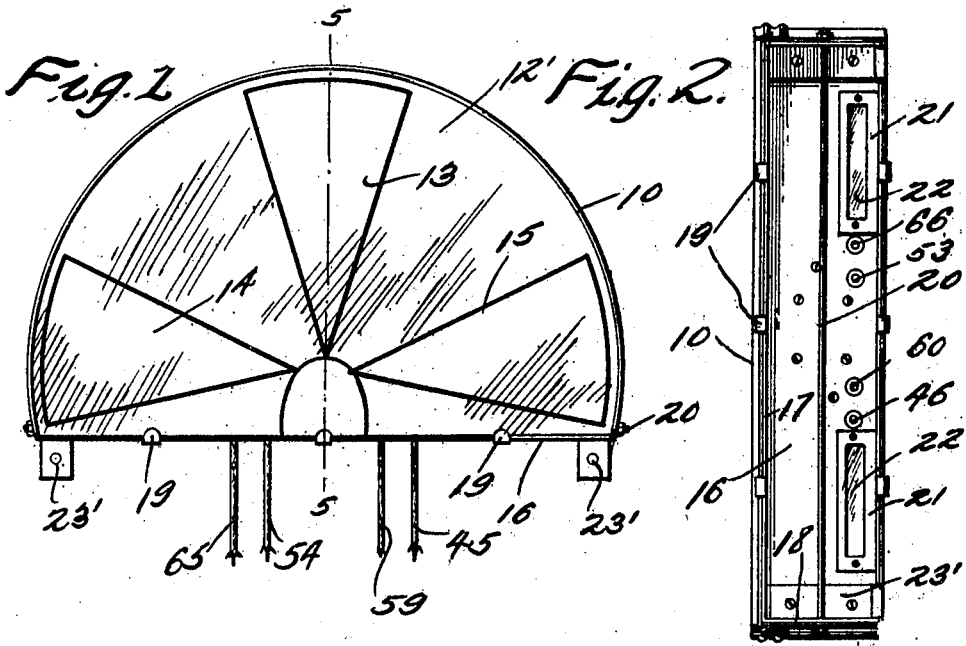
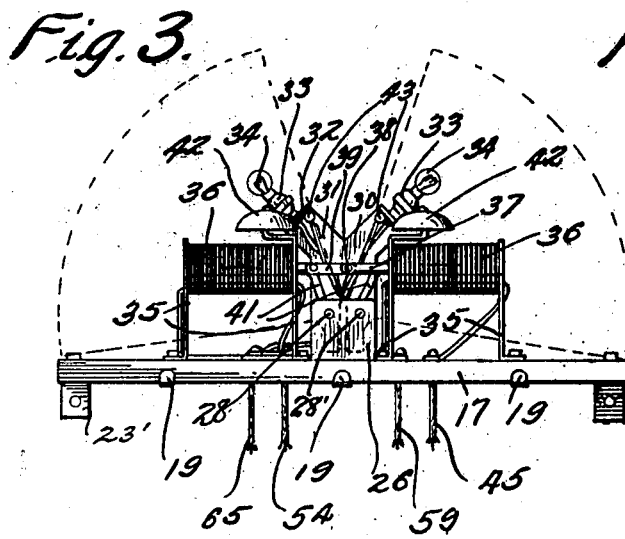
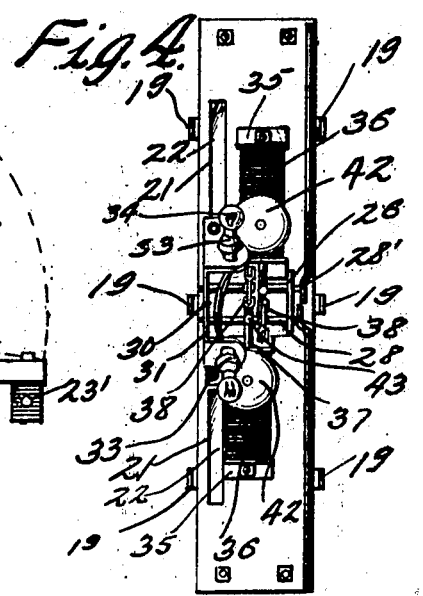

UNITED STATES PATENT OFFICE.

LEE A. OWNBEY AND ARTHUR A. OWNBEY, OF CHATTANOOGA, TENNESSEE.

DIRECTION-INDICATOR.

1,292,028.  Specification of Letters Patent.  Patented Jan. 21, 1919.

Application filed July 16, 1917. Serial No. 180,811.

*To all whom it may concern:*

Be it known that we, LEE A. OWNBEY and ARTHUR A. OWNBEY, citizens of the United States, residing at Chattanooga, in the county of Hamilton, State of Tennessee, have invented certain new and useful Improvements in Direction-Indicators; and we do hereby declare the following to be a full, clear and exact description of the invention, such as will enable others skilled in the art to which it appertains to make and use the same.

This invention is an improvement in signals and has particular reference to a direction indicator for automobiles and other vehicles.

An object of the invention is to provide an improved apparatus for indicating to pedestrians and drivers of other machines, the direction the vehicle is about to travel and which is so constructed that the indications will be visible at night as well as during daylight.

Another object is to provide the casing of the apparatus with indicating openings adapted to be brought into relief by sources of light within the casing and shaped and arranged to clearly designate the intended direction of the machine, said openings being adapted to be covered and uncovered by independently adjustable shutter elements which, when operated, separately, will expose only one of the openings at a time.

The inventive idea involved is capable of receiving a variety of mechanical expressions, one of which, for the purpose of illustrating the invention, is shown in the accompanying drawings, wherein:—

Figure 1 is a front elevation of the apparatus constructed in accordance with the invention, Fig. 2 is a bottom plan view thereof.

Fig. 3 is an elevation of the shutter operating mechanism, the shutters being shown in dotted lines, Fig. 4 is a plan view of the shutter operating mechanism, Fig. 5 is a vertical transverse section on the line 5—5 of Fig. 1, Fig. 6 is a perspective view of a supporting frame employed in connection with the invention, Fig. 7 is a similar view of one of the shutter elements, and Fig. 8 is a diagrammatic view of the electric circuits employed.

The drawings illustrate what is now believed to be a preferred form of the invention which comprises a metallic, substantially semi-circular casing 10, the front of which is formed by the inner and outer panels of glass 11 and 12 spaced a slight distance apart, for a purpose which will appear in the course of the description, the inner panel 11 being preferably painted red so as to render the same translucent. The outer panel 12 is partially painted to render a portion of its surface opaque and the unpainted parts are left transparent so as to provide the spaced, radially disposed openings 13, 14 and 15 through which the inner panel 11 is visible. The unpainted portions of the outer panel 12 are designated as openings throughout the course of the specification for purposes of clarity and facility of description. The central or vertically disposed opening 13 is normally uncovered, as will later appear, and is adapted to indicate that the vehicle will travel straight ahead while the horizontally disposed openings 14 and 15 are adapted to indicate, when uncovered, that the vehicle will travel either to the left or right or when both are exposed, that the vehicle will stop.

The bottom 16 of the casing is detachable and provided with side and end flanges 17 and 18 respectively, the flanges 17 having spaced clips 19 for receiving the bottom edge of the outer panel 12. Extending through the ends of the casing 10 and also through the end flanges 18 of the bottom 16 is a supporting rod 20 adapted to retain the bottom in proper engagement with the casing and removable in order to detach said bottom whereby access may be had to the mechanism carried thereby. The bottom is provided with the elongated openings 21 covered by sheets of glass 22 through which the ray of light from the interior of the casing will project and be cast upon license plates which may be supported below the indicator if desired. The bottom further has secured thereto the brackets 23' employed for the purpose of mounting the indicator upon the vehicle in any desired place, it being understood that two of these indicators may be employed in which case one will be mounted upon the front of the vehicle while the other will be secured to the back.

A supporting frame 23 is preferably mounted upon the upper surface of the bottom 16 intermediate its ends and said frame is preferably formed from sheet metal bent to provide a base 24 secured to the bottom 16 by small bolts 25 and extending from the base are the upturned ends 26 and 27. Rotatably mounted in these ends is a pair of parallel rock shafts 28 and 28', the front ends of which project beyond the end 26 and have secured thereto the shutter elements 29. These elements are preferably formed of sheet metal cut in the form of segments and have their outer faces painted white so that when the same cover any of the openings 13, 14 or 15 the red panel 11 will not be visible. The shutters 29 are arranged so as to occupy the space between the panels 11 and 12 and are normally in positions so as to cover the openings 14 and 15 and leave the opening 13 exposed, the shutters assuming this position by reason of their own weight. The upper portion of the rear end 27 of the supporting frame is bifurcated as indicated at 30 to form the extensions 31 having their extremities 32 bent forwardly to provide supports for the lamp sockets 33 having the small incandescent lamps 34 mounted therein.

Pairs of brackets 35 are preferably secured to the bottom 16 on each side of the supporting frame 23 and each pair of brackets has a solenoid 36 having the usual cores 37. The outer end of each core 37 is bifurcated at 38 and has pivotally mounted therein one end of a link 39. The other end of the link 39 carried by the solenoid at the right of the supporting frame 23, as shown in Fig. 3, is pivotally connected to the free end of an arm 41 secured to the rock shaft 28 upon which is mounted the shutter element 29 shown at the left. The link 39 connected to the core of the solenoid shown at the left has pivoted thereto one end of an arm 41, the other end of which is secured to the rock shaft 28' carrying the shutter element 29 shown at the right. It will thus be apparent that when either or both of the solenoids are energized, as will appear in the course of the description, and the cores thereof are drawn inwardly the rock shafts to which said cores are connected will be actuated to swing the shutter elements 29 to a position where the same will expose the normally closed openings adjacent thereto and, by reason of the adjustment of either or both of the shutter elements the same will assume a position to cover the normally exposed opening 13. Thus, if the shutter element to the left is actuated the same will uncover the opening 14 and will move to a position where the same will cover the opening 13 and the shutter element to the right remaining stationary, and it will be apparent that only the opening 14 will be exposed, thus indicating that the vehicle is about to be turned to the left or the right depending upon which end of the vehicle the indicator is mounted.

Means are also provided in connection with the invention for signaling to the driver of the vehicle that the shutter elements have been properly adjusted and that the solenoids and other connections are in proper working order, and, to this end, use is preferably made of a bell 42 carried by each of the bars or brackets 35, each bell having associated therewith a striker 43 carried by the outer end of each core of the solenoid so that when the same is energized and moved inwardly, as previously described, the bells will be engaged by the striker and rung, in which instance the driver will be informed that the shutter element has been adjusted and that the parts are in working order.

The means for illuminating the lamps 34 and operating the shutter elements 29 preferably comprises a number of electric circuits, illustrated in Fig. 8, to which current is supplied from a common source of power such as the batteries 44. The light circuit consists of a wire 45 leading from the battery to a binding post 46 carried by the bottom 16. A wire 47 extends from the binding post 46 and is connected to one of the contacts of a switch 48 for controlling lamps 34, and leading from the switch to the lamps are the wires 49 and 50. The other wires 51 and 52 are joined to a binding post 53 also carried by the bottom 16 and leading from this binding post and connected to the batteries 44 is a wire 54. It will thus be seen that when it is desired to illuminate the lamps 34 the switch 48 may be closed and thus cause said lamps to continually burn so that any one of the openings 13, 14 or 15 will be clearly visible in the night-time. It is also to be noted that while the shutter elements 29 remain in their normal positions, the opening 13 will be continuously exposed and act as a taillight when the apparatus is secured to the rear of the machine.

The circuits for the shutter elements are operated independently of the light circuit and said circuits include a common wire 55 joined to the wire 45 at the point 56 and leading to a pair of switch buttons 57 and 58 preferably mounted upon the steering wheel of an automobile within easy reach of the driver so that the same may be readily manipulated. Should it be desired to energize the solenoid 36 shown at the right of the several figures the switch button 57 is depressed to close the circuit leading through the wire 59 connected at one end to one of the contacts of said switch and at its other end to the binding post 60 carried by the bottom 16. A wire 61 is extended from the binding post 60 to the right hand solenoid where the same is connected to the windings thereof and from whence the current passes through a wire 62 to the connecting point 63 which is connected to the binding post 53 by means of a wire 64. The current will then pass from this binding post 53 through the wire 54 back to the battery 44 thus completing the circuit. Should it be desired to energize the left hand solenoid 36 the switch button 58 is operated to pass the current through the wire 65 to the binding post 66 carried by the bottom 16 and leading from this binding post is a wire 67 connected to the solenoid from which extends the wire 68 secured to the connecting point 63. The current then passes through the wires 64 and 65 to the batteries. When it is desired, by the driver of the vehicle, to signal that the machine is coming to a stop both of the shutter elements 29 are operated by actuating both of the switches 57 and 58 thus closing both circuits simultaneously and actuating the elements 29 to a position where the same will expose the openings 14 and 15 and cover the opening 13. It will thus be apparent that the shutter elements may be operated independently or simultaneously to expose either or both of the openings 14 and cover the opening 13.

What is claimed is:—

1. In a direction indicator, the combination of a casing having a plurality of indicating openings, adjustable means within said casing normally in a position to cover all but one of said openings, and means for adjusting the last named means to expose any one of the covered openings and cover the normally exposed opening.

2. In a direction indicator, the combination of a casing having a plurality of indicating openings, adjustable means within said casing normally in a position to cover all but one of said openings, and means for adjusting the last named means to expose the covered openings and cover the normally exposed opening.

3. In a direction indicator, the combination of a casing having a plurality of indicating openings, shutter elements within said casing normally in positions to cover all but one of said openings, and means for adjusting said shutter elements to expose the covered openings and cover the normally exposed opening.

4. In a direction indicator, the combination of a casing having a plurality of indicating openings, shutter elements within said casing normally in positions to cover all but one of said openings, and solenoids operatively connected to said shutter elements whereby to adjust the same to expose said covered openings and cover the normally exposed opening.

5. In a direction indicator, the combination of a casing having a plurality of indicating openings, shutter elements within said casing normally in positions to cover all but one of said openings and retained in said position by gravity, and solenoids operatively connected to said shutter elements whereby to adjust the same to expose said covered openings and cover the normally exposed opening.

6. In a direction indicator, the combination of a casing, spaced panels mounted therein, one of which is provided with a plurality of indicating openings, shutter elements adjustably disposed between said panels and normally in positions to cover all but one of said openings, and means for adjusting said shutter elements whereby to expose the covered openings and uncover the normally exposed opening.

7. In a direction indicator, the combination of a casing having a plurality of indicating openings, shutter elements within said casing normally in positions to cover all but one of said openings and retained in said position by gravity, solenoids operatively connected to said shutter elements whereby to adjust the same to expose said covered openings and cover the normally exposed opening, and sources of light within said casing.

8. In a direction indicator, the combination of a casing, spaced panels mounted therein one of which is provided with a plurality of indicating openings, a bottom for said casing, a supporting frame mounted upon said bottom, rock shafts mounted in said frame, shutter elements secured to said rock shafts and disposed between said spaced panels normally in positions to cover all but one of said openings, a solenoid supported upon said bottom on each side of said supporting frame, and link connections between the cores of said solenoids and said rock shafts whereby the latter are actuated to adjust said shutter elements when the solenoids are energized.

9. In a direction indicator the combination of a casing, spaced panels mounted therein, one of which is provided with a plurality of indicating openings, shutter elements adjustably disposed between the panels and normally in positions to cover all but one of said openings, means including an electric circuit for adjusting said shutter elements whereby to expose the covered openings and uncover the normally exposed opening, sources of light mounted in said casing, and a second electric circuit connected with the first named circuit and closed independently thereof for illuminating said sources of light.

10. In a direction indicator, the combination of a casing, an inner translucent panel mounted therein and an outer panel spaced from the inner panel and having a portion of its surface opaque and the remaining portions transparent to provide openings, shutter elements operable between said panels to cover and uncover said openings, and a source of light in the casing behind the first named panel.

In testimony whereof we affix our signatures in the presence of two witnesses.

LEE A. OWNBEY.
ARTHUR A. OWNBEY.

Witnesses:
A. S. HIGGINS,
G. W. NEWSTREET.